United States Patent [19]

Niswander

[11] Patent Number: 5,246,619
[45] Date of Patent: Sep. 21, 1993

[54] SOLVENT COMPOSITION FOR REMOVING ACID GASES

[75] Inventor: Ronnie H. Niswander, Lake Jackson, Tex.

[73] Assignee: The Dow Chemical Company, Midland, Mich.

[21] Appl. No.: 817,572

[22] Filed: Jan. 7, 1992

Related U.S. Application Data

[63] Continuation-in-part of Ser. No. 438,924, Nov. 17, 1989, abandoned.

[51] Int. Cl.$^5$ .................................. C09K 3/00
[52] U.S. Cl. ............................ 252/183.11; 423/228; 423/229; 423/242.7; 252/190; 564/511
[58] Field of Search .......... 423/226, 228, 229, 242 A, 423/243, 242.7, 243.01, 243.06; 252/183.11, 190; 564/511

[56] References Cited

U.S. PATENT DOCUMENTS 3,622,267  11/1971  Bartholome et al. ................. 23/2 R
4,336,233   6/1982  Appl et al. ......................... 423/228
5,108,723   4/1992  Chang et al. ....................... 423/242

Primary Examiner—Gary P. Straub
Assistant Examiner—Timothy C. Vandy

[57] ABSTRACT

The invention relates to an alkanolamine composition for the removal of acid gas impurities comprising CO2, H2S, COS, or mixtures thereof, from a gaseous or liquefied gas stream containing said acid gases, and to a process of using the alkanolamine composition. The process involves contacting the gas stream with the alkanolamine composition, or an aqueous solution thereof, comprising a mixture of methyldiethanolamine (MDEA) and methylmonoethanolamine (MMEA) in an amount sufficient to generate in situ at least 5% by weight of N,N'-bis(dimethyl)-N-hydroxyethylethylenediamine (DMHEED), in a contact zone, regenerating said amine composition in a regeneration zone, and recycling said regenerated amine composition to said contact zone. The invention also resides in an aqueous solution comprising from about 20% to about 70% by weight of DMHEED. The invention further resides in the addition of DMHEED in an amount of from about 5% to about 30% by weight to compositions or solutions containing other alkanolamines. The invention further includes a method for producing DMHEED.

7 Claims, No Drawings

SOLVENT COMPOSITION FOR REMOVING ACID GASES

This is a continuation in part of application Ser. No. 07/438,924. filed Nov. 17, 1989 and now abandoned on 12 Aug. 1992.

The invention generally resides in an a chemical solvent composition for use in the removal of acid gases such as $CO_2$, $H_2S$, COS, etc. from a synthetic, natural, or a liquefied gas stream. More specifically, one particular aspect of the invention resides in the removal of acid gases from the gas stream by contacting the gas stream in an absorber or contact column with an alkanolamine composition comprising a tertiary amino alcohol, particularly methyldiethanolamine (MDEA), a secondary amino alcohol, particularly methylmonoethanolamine (MMEA), with the remainder, if any, being water.

It is a particular object of the invention to employ MMEA in the composition in an amount sufficient to generate, in situ, N,N'-bis(dimethyl)-N-hydroxyethylethylenediamine (DMHEED) as a conversion product during contact of the gas stream in the absorber. More particularly, MMEA should be present in an amount of at least 10% by weight to generate DMHEED in an amount sufficient for effective removal of acid gases from the gas stream. Optionally, the chemical solvent composition can contain other alkanolamines with DMHEED added to the composition. Alternatively, the invention also provides for an aqueous solution of DMHEED alone.

Small amounts of other compounds such as corrosion inhibitors or antifoam agents can also be added to the solvent. These compounds are known to those skilled in the art and are sometimes used in gas treating solvents.

BACKGROUND OF THE INVENTION

The use of alkanolamines for removing acid gases such as $CO_2$, $H_2S$ and COS from natural and synthetic gas streams has been an industrial process for many years. The process is characterized by contacting the gas stream in an absorber or contact column with an alkanolamine, which is generally classified as a chemical solvent. The acid gases are removed from the gas stream by reaction with the solvent. In a continuous operation, the solvent is then sent to a desorber, or stripping column. The acid gases are separated from the solvent in a desorber by reducing the partial pressure of the acid gas over the solution and/or stripping the chemical solvent with steam. The steam is normally produced from the chemical solvent itself by heating the solvent in a reboiler. The lean solvent is then recycled back to the absorber and the process is repeated.

Although many improvements have been made in this process, the general concept of absorption followed by desorption in a cyclic manner has not changed. There have also been many improvements in the type of alkanolamines used in this process. In this regard, it is well known that most alkanolamines will slowly degrade under process conditions. As the alkanolamine degrades, it produces degradation products which are detrimental in that they reduce the absorbtivity of the chemical solvent, cause solvent foaming, and/or contribute to a corrosion of the process equipment. This is particularly true of primary and secondary alkanolamines used to remove carbon dioxide and/or carbonyl sulfide.

Initially, monoethanolamine (MEA), a primary alkanolamine, was used almost exclusively in the removal of acid gases. To prevent excess corrosion, the MEA concentration in the solvent is kept relatively low. This requires high solvent circulation rates, resulting in high energy requirements. In order to prevent corrosion and poor performance, the solvent must be periodically replaced or purified to remove these degradation products.

Purification usually involves the continuous thermal distillation of a small side-stream of the MEA. This solvent reclaimer, as it is called, maintains the MEA in an acceptable operating condition, but requires an additional amount of energy to operate. The bottoms from the reclaimer also represent a significant loss of MEA as well as a hazardous waste that is difficult to dispose of. This adds substantially to the operating expense.

As energy and capacity requirements increased, another solvent, i.e. diethanomlamine (DEA), began to be used. Since DEA is a secondary alkanolamine, it is more stable, less reactive, and potentially less corrosive than MEA, and can be used in higher concentrations. This increases the capacity of the solvent and decreases the overall energy requirement. However, DEA degradation is well known and is still a serious problem. Its degradation products have also been associated with the corrosion of process equipment. Thermal reclaiming of DEA is more difficult than with MEA due to its higher boiling point which is similar to that of many of its degradation compounds.

It is also known that tertiary amines, such as methyldiethanolamine (MDEA), do not undergo the same type of chemical and thermal degradation that primary and secondary amines undergo. As a result, tertiary amines are much more stable in gas treating processes, and MDEA is becoming increasingly acceptable as a replacement for MEA and DEA. Not only is MDEA more stable than MEA and DEA, it is potentially less corrosive and can be used in even higher concentrations. Higher amine concentrations also mean increased capacity and lower energy requirements. Unfortunately, the reactivity of $CO_2$ with MDEA is much slower than with MEA and DEA. As a result, MDEA alone cannot be used in some applications which require almost complete $CO_2$ removal. To get around this problem, DEA or MEA are sometimes added to MDEA to improve solvent reactivity. Such solvent mixtures have increased capacity and lower energy requirements than MEA or DEA by themselves, but are less stable than MDEA alone. Solvent degradation can make the benefits of using MDEA/MEA or MDEA/DEA mixtures uneconomical.

PRIOR ART

German Patent No. 1,542,415 teaches that improved reaction rates are achieved by adding monoalkylalkanol amines or morpholine or its derivatives to a chemical or physical solvent. However, no suggestion is made for the use of MDEA with MMEA or solvents containing DMHEED.

It is known from U.S. Pat. No. 3,622.267. to Bartholome et al, that COS can be removed from a gas stream by adding small amounts of from 0.1 to 0.4 mole per liter (0.75% to 3.0% by wt.) of MMEA to aqueous solutions of MDEA. This patent does not recognize the advantage of using higher concentrations of at least 10% by weight MMEA with MDEA. In fact, since higher concentrations of MMEA would require increased heat consumption, it would be in direct contradiction to the teachings of the patent.

It is known from U.S. Pat. No. 4,336,233 to Appl et al, that the use of piperazine with MDEA will accelerate the absorption of acid gases such as $H_2S$, $CO_2$, and COS. However, piperazine is a difunctional heterocyclic amine and not an alkanolamine, and therefor has limited solubility in chemical solvents such as aqueous solutions of MDEA. Accordingly, high concentrations of piperazine are not desirable.

Appl et al also teach the use of piperazine in combination with MMEA and the superiority of piperazine over MMEA when used in combination with MDEA. Such superiority was demonstrated with a relatively low concentration of MMEA of from 1.3 to 2.6% by weight and piperazine at a concentration of from 0.4 to 3.0% by weight. Appl et al failed to recognize the advantage of using a higher concentration of at least 10% by weight MMEA when used in combination with other chemical solvents. No mention is made of the benefits derived from the in situ generation of DMHEED in the conversion of MMEA at such higher concentration.

U.S. Pat. No. 4,551,158 and U.S. Pat. No. 4,553,984 to Volkamer et al teach the use of MMEA at a maximum concentration of 7.5% by weight when used in combination with MDEA. However, both Patents fail to recognize the advantage of using MMEA at a concentration higher than 7.5% by weight and no mention is made of the benefits derived from the in situ generation of DMHEED in the conversion of MMEA at such higher concentration.

SUMMARY OF THE INVENTION

It is a particular object of the present invention that in the use of alkanolamine compositions in the removal of acid gases, such as $CO_2$, $H_2S$, COS, etc. from a synthetic, natural, or a liquefied gas stream, the use of at least 10% by weight of MMEA generates, in situ, N,N'-bis(dimethyl)-N-hydroxyethyl-ethylenediamine (DMHEED) in an amount sufficient for effective removal of said acid gases from the gas stream. DMHEED is itself a more stable and less volatile difunctional alkanolamine. The empirical formula for DMHEED is as follows:

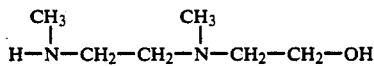

The uniqueness of this compound is that it contains both a secondary and tertiary amine group. Both amine groups are methyl substituted and function similar to a mixture of monofunctional alkanolamines containing equivalent secondary and tertiary amine groups. Suprisingly, the performance of DMHEED in terms of acid gas removal has been found to be substantially better than mixtures of MMEA and MDEA at the same relative concentration. The in situ formation of DMHEED and its effect on the long term performance of gas treating solvents containing MMEA has not until now been recognized.

During the course of the gas treatment, some or all of the MMEA is converted to DMHEED as observed, for example, through gas chromatographic analysis. The amount of DMHEED produced will not be more than the amount of MMEA in the orginal solvent mixture.

The invention particularly resides in an aqueous solution adapted for use in the removal of acid gases comprising $CO_2$, $H_2S$, COS, or mixtures thereof, from gaseous or liquefied gas streams containing said acid gases, said solution being selected from the group consisting of;

1) from about 20% to about 70%% by weight of N,N'-bis(dimethyl)-N-hydroxyethyl-ethylenediamine (DMHEED), with the remainder being water,
2) a solution of at least one secondary amine with from about 5% to about 30% by weight of N,N'-bis(dimethyl)-N-hydroxyethyl-ethylenediamine (DMHEED), and up to about 60% by weight of water,
3) a solution of at least one tertiary amine with from about 5% to about 30% by weight DMHEED, and up to about 60% by weight of water,
4) a solution of from about 10% to about 35% by weight of at least one secondary amine and from about 30% to about 70% by weight of at least one tertiary amine, with from about 5% to about 30% by weight DMHEED, and up to about 60% by weight of water.

It will be understood that the composition can be used as a concentrate where it contains substantially no water or as an aqueous composition where it contains as much as 60% by weight water.

This invention also resides in a method for producing N,N'-bis(dimethyl)-N-hydroxyethyl-ethylenediamine (DMHEED), comprising the steps of reacting methyl-monoethanolamine (MMEA), or an aqueous solution of MMEA, at a concentration of at least about 10% by weight, with $CO_2$ at a partial pressure of at least 50 psig (446 kPa) and at a temperature of at least 50° C. but not greater than about 150° C.

This invention further resides in a process for the removal of acid gases comprising $CO_2$, $H_2S$, COS, or mixtures thereof, from a gaseous or a liquefied gas stream with an aqueous amine solution in a contact zone, said solution being selected from the group consisting of 1) from about 20% to about 70% by weight of N,N'-bis(dimethyl)-N-hydroxyethyl-ethylenediamine (DMHEED), with the remainder being water,
2) a solution of at least one secondary amine with from about 5% to about 30% by weight of N,N'-bis (dimethyl)-N-hydroxyethyl-ethylenediamine (DMHEED), and up to about 60% by weight of water,
3) a solution of at least one tertiary amine with from about 5% to about 30% by weight DMHEED, and up to about 60% by weight of water, and
4) a solution of from about 10% to about 35% by weight of at least one secondary amine and from about 30% to about 70% by weight of at least one tertiary amine, with from about 5% to about 30% by weight DMHEED, and up to about 60% by weight of water, regenerating said amine solution in a regeneration zone, and recycling said regenerated amine solution to said contact zone.

During the course of using the aqueous amine compositions a sufficient amount of the MMEA must be present so that DMHEED can be formed, in situ, in a significant amount of at least 5% by weight. Only if the concentration of MMEA is at least 10% by weight, or greater, can a significant conversion of the DMHEED take place, sufficient to generate at least 5% by weight of the DMHEED.

Optionally, DMHEED can be added to MMEA or mixtures thereof, such that the weight of DMHEED in the composition is from about 5% to about 30% by weight, preferably from about 10% to about 25% by weight, more preferably from about 15% to about 20% by weight.

The invention also includes an aqueous solution of DMHEED by itself for acid gas removal. The aqueous solution contains DMHEED in an amount of from about 20% to about 70% by weight, preferably from about 30% to about 60% by weight, more preferably from about 40% to about 50% by weight, the remainder of the solution comprising water.

The invention further includes a method for producing DMHEED for MMEA and carbon dioxide by exposing chemical solvents containing MMEA to $CO_2$ and heat. The rate of formation of DMHEED increases with the concentration of MMEA and $CO_2$ as well as the temperature of the process. The MMEA concentration should be at least about 10% by weight and the temperature should be at least about 50° C. but not greater than about 150° C., as otherwise excessive thermal degradation of the MMEA and DMHEED can occur.

The optimum concentrations of the individual components in solvent mixtures containing for example: 1) MDEA and MMEA; 2) MDEA, MMEA and DMHEED: 3) MDEA and DMHEED; 4) MMEA and DMHEED: or 5) DMHEED alone, depend upon a number of factors including the process equipment design, the inlet gas composition, the treated gas specification, the total pressure, the gas flow rate, the solvent circulation rate, and the inlet gas and solvent temperatures.

DMHEED has been found to be effective for the removal of acid gases when it is present at a level of at least about 5% and up to about 70% by weight in the aqueous amine solution depending upon the presence and concentration of other solvent components, particularly MDEA, MMEA, or mixtures thereof.

DESCRIPTION OF THE PREFERRED EMBODIMENTS

The process of this invention uses the conventional equipment and detailed procedures known to the art as disclosed in U.S. Pat. No. 1,783,901 to Bottoms, and in subsequent improvements which are known in the art. The process according to the invention can be carried out in either trayed or packed columns, and can contain other peripheral equipment as necessary for optimum operation. Such equipment could include an inlet gas separator, a treated gas coalescer, a solvent flash tank, a particulate filter, and a carbon bed purifier. The inlet gas flow rate will vary depending on the size of the equipment but is typically between 5 and 100 million standard cubic feet per day (SCFD) (0.14 to 2.8 million m3/day). The solvent circulation rate will depend on the amine concentration, the gas flow rate, gas composition, total pressure and treated gas specification. The solvent circulation rate is typically between 5 and 5000 gallons per minute (gpm) (18.9 to 18,925 1/min.). Pressure inside the absorber can vary between 0 and 1200 psig (1.03 to 85 kg/cm$^2$) depending on the type of gas being processed. Temperatures inside the absorber can vary between 80° F. and 150° F. (26.7° C. to 65.6° C.). Temperatures inside the stripper can vary between 180° F. and 250° F. (82.2° C. to 121° C.) and with the hottest temperature in the reboiler. The stripper overhead pressure is typically between 0 and 20 psig. (101 to 239 kPa).

The invention is further illustrated but not limited by the following examples.

EXAMPLE 1

The relative reactivity of a solvent with 35% by weight MDEA, 15% by weight MMEA, and 50% by weight water was compared to a control solvent with 45% by weight MDEA, 5% by weight MMEA, and 50% by weight water.

In a standard test, 50 grams of the solvent being tested is added to a small absorber which is maintained at a constant temperature of 120° F. (48.9° C.). The solvent and the absorber system is purged with nitrogen and pressurized to 100 psig (790 kPa). A precalibrated gas mixture of 75 mole % $CO_2$ and 25 mole % $N_2$ is bubbled through the solvent at 100 cc/min. A Carle analytical chromatograph with thermal conductivity detector and automatic sample injection valve is then used to measure the composition of the treated gas over a period of time. The decrease in the $CO_2$ concentration, is a measure of solvent reactivity. The lower the $CO_2$ concentration in the treated gas, the better the solvent reactivity. The results are shown in Table 1.

TABLE 1

| Time From Start of Gas Addition | Mole % $Co_2$ in Treated Gas | |
|---|---|---|
| | Example | Control |
| 21 min. | 0.5 | 2.3 |
| 42 min. | 6.1 | 26.1 |
| 63 min. | 28.2 | 49.0 |
| 83 min. | 52.1 | 59.7 |
| 104 min. | 64.4 | 65.3 |

The results shown in Table 1 illustrate the higher reactivity of a solvent solution containing 15% by weight MMEA as compared to a control solvent containing only 5% by weight MMEA. Substantially lower concentrations of $CO_2$ were detected at the higher concentration of 15% by weight MMEA at equivalent time intervals.

EXAMPLE 2

DMHEED is made and isolated from MMEA, and is evaluated for its ability to absorb $CO_2$ under the same conditions outlined in Example 1. The reactivities of an aqueous solution of 50% by weight DMHEED, and an aqueous solution of 35% by weight MDEA and 15% by weight DMHEED are shown in Table 2. The reactivity of both the mixed solvent of MDEA with DMHEED and DMHEED alone was found to be better than the mixed solvent of Example 1 containing MDEA and MMEA.

TABLE 2

| Time from Start of Gas Addition | Mole % CO2 in Treated Gas | | |
|---|---|---|---|
| | 35% MDEA 15% MMEA | 35% MDEA 15% DMHEED | 50% DMHEED |
| 21 min. | 0.5 | 0.4 | 0.1 |
| 42 min. | 6.1 | 5.6 | 0.3 |
| 63 min. | 28.2 | 28.0 | 0.9 |
| 83 min. | 52.1 | 43.1 | 10.1 |
| 104 min. | 64.4 | 52.9 | 12.5 |

It is apparent from Table 2 that the absorbtion of $CO_2$ with solvents containing DMHEED resulted in a treated gas stream having a substantially smaller mole percentage of $CO_2$.

EXAMPLE 3

The solvents in example 1 were subjected to conversion at an accelerated rate at a temperature of 150° C. for 45 hours under a $CO_2$ atmosphere. The test procedure was to equip a 4 liter autoclave with a stirrer, pressure gauge, pressure relief valve, thermocouple, cooling coil and dip tube. The autoclave was heated by a ceramic band heater and controlled by a thermocouple inside the autoclave. 2000 grams of the solvent were added to the autoclave and purged with nitrogen gas. Carbon dioxide was added until the pressure rose to 500 psig (3546 kPa). The stirrer was turned on and the 45 hour test runs were started after the inside temperature reached 150° C. After the test period, the solvent was cooled and analyzed by gas chromatography to determine the amount of conversion to DMHEED. The results are shown in Tables 3 and 4.

TABLE 4

|  | Control | |
|---|---|---|
|  | before conversion (wt %) | after conversion (wt %) |
| MDEA | 45.0 | 41.4 |
| MMEA | 5.0 | 1.9 |
| DMHEED | 0 | 0.7 |

TABLE 3

|  | Example | |
|---|---|---|
|  | before conversion (wt %) | after conversion (wt %) |
| MDEA | 35.0 | 31.5 |
| MMEA | 15.0 | 4.6 |
| DMHEED | 0.0 | 7.1 |

From Tables 3 and 4, it can be seen that only a minimal amount of DMHEED was produced in the conversion of 5% by weight of the MMEA (Table 3), whereas the use of a larger quantity of 15% by weight of the MMEA (Table 4) produced 7.1% by weight of the desired DMHEED, sufficient to enhance the absorption of acid gas impurities from a gas stream.

What is claimed is:

1. An aqueous solution adapted for use in the removal of acid gases comprising $CO_2$, $H_2S$, COS, or mixtures thereof, from gaseous or liquefied gas streams containing said acid gases, said solution being selected from the group consisting of;
   1) from about 20% to about 70% by weight of N,N'-bis(dimethyl)-N-hydroxyethyl-ethylenediamine (DMHEED), with the remainder being water,
   2) a solution of at least one secondary amine with from about 5% to about 30% by weight of N,N'-bis (dimethyl)-N-hydroxyethyl-ethylenediamine (DMHEED), and up to about 60% by weight of water,
   3) a solution of at least one tertiary amine with from about 5% to about 30% by weight DMHEED, and up to about 60% by weight of water, and
   4) a solution of from about 10% to about 35% by weight of at least one secondary amine and from about 30% to about 70% by weight of at least one tertiary amine, with from about 5% to about 30% by weight DMHEED, and up to about 60% by weight of water.

2. The solution of claim 1, wherein solution 1) contains from about 30% to about 60% by weight of DMHEED.

3. The solution of claim 1, wherein solution 1) contains from about 40% to about 50% by weight of DMHEED.

4. The solution of claim 1, wherein each solution under 2), 3) or 4) contains from about 10% to about 25% by weight of DMHEED.

5. The solution of claim 1, wherein each solution under 2), 3) or 4) contains from about 15% to about 20% by weight of DMHEED.

6. The solution of claim 1, wherein said tertiary amine is methyldiethanolamine (MDEA) and said secondary amine is methylmonoethanolamine (MMEA).

7. A method for producing N,N'-bis(dimethyl)N-hydroxyethyl-ethylenediamine (DMHEED), comprising the steps of reacting methylmonoethanolamine (MMEA), or an aqueous solution of MMEA, at a concentration of at least about 10% by weight, with $CO_2$ at a partial pressure of at least 50 psig (446 kPa) and at a temperature of at least 50° C. but not greater than about 150° C.

* * * * *